United States Patent
Messer et al.

(10) Patent No.: US 8,695,868 B2
(45) Date of Patent: Apr. 15, 2014

(54) COMPOSITIONS AND METHODS FOR DISSIMILAR MATERIAL WELDING

(75) Inventors: Barry Messer, Calgary (CA); Shawn Seitz, Calgary (CA)

(73) Assignee: Fluor Technologies Corporation, Aliso Viejo, CA (US)

( * ) Notice: Subject to any disclaimer, the term of this patent is extended or adjusted under 35 U.S.C. 154(b) by 413 days.

(21) Appl. No.: 12/303,674

(22) PCT Filed: Aug. 27, 2007

(86) PCT No.: PCT/US2007/019074
§ 371 (c)(1),
(2), (4) Date: Jan. 20, 2009

(87) PCT Pub. No.: WO2008/027474
PCT Pub. Date: Mar. 6, 2008

(65) Prior Publication Data
US 2010/0233501 A1 Sep. 16, 2010

Related U.S. Application Data

(60) Provisional application No. 60/824,023, filed on Aug. 30, 2006.

(51) Int. Cl.
*B23K 20/12* (2006.01)

(52) U.S. Cl.
USPC .................................. 228/112.1; 285/148.12

(58) Field of Classification Search
USPC .................................. 228/112.1; 285/148.12
See application file for complete search history.

(56) References Cited

U.S. PATENT DOCUMENTS

| 255,163 | A |   | 3/1882 | Goldschmid |
|---|---|---|---|---|
| 331,588 | A |   | 9/1906 | Wood |
| 2,159,811 | A |   | 5/1939 | Leonardo |
| 3,093,791 | A | * | 6/1963 | Richards ....................... 324/451 |
| 3,354,063 | A |   | 11/1967 | Shutt |
| 3,858,911 | A |   | 1/1975 | Martin |
| 4,333,670 | A | * | 6/1982 | Holko ....................... 285/148.12 |
| 4,333,671 | A |   | 6/1982 | Holko |
| 4,345,785 | A |   | 8/1982 | Bradford |
| 4,712,812 | A |   | 12/1987 | Weir, III |
| 4,848,804 | A |   | 7/1989 | Weigl |

(Continued)

FOREIGN PATENT DOCUMENTS

| JP | 62220291 | 9/1987 |
|---|---|---|
| JP | 02134485 | 5/1990 |

(Continued)

OTHER PUBLICATIONS

Second Office Action dated Sep. 18, 2013 for Japanese Application No. 2009-526714 in the name of Fluor Technologies Corporation based on PCT/US07/19074 entitled Compositions and Methods for Dissimilar Material Welding.

*Primary Examiner* — Nicholas P D'Aniello
(74) *Attorney, Agent, or Firm* — Fish & Tsang, LLP

(57) ABSTRACT

Devices and methods of welding dissimilar materials are contemplated in which an adaptor is used in an intermediate position between the dissimilar materials. Most preferred adaptors are manufactured by friction stir welding from two dissimilar materials that are identical or similar to the dissimilar materials to be welded together. Therefore, coupling of dissimilar materials in the field via the adaptors is greatly simplified as conventional welding methods can now be employed.

5 Claims, 1 Drawing Sheet

(56) References Cited

U.S. PATENT DOCUMENTS

| | | | |
|---|---|---|---|
| 5,293,903 A | | 3/1994 | Appelwick |
| 5,364,013 A | | 11/1994 | Scheuerman |
| 5,971,252 A | * | 10/1999 | Rosen et al. ............... 228/112.1 |
| 6,065,781 A | * | 5/2000 | Titus ............................... 285/55 |
| 6,585,148 B2 | | 7/2003 | Aono et al. |
| 6,832,785 B1 | | 12/2004 | Zitkovic, Jr. |
| 2003/0047587 A1 | | 3/2003 | Aono et al. |
| 2003/0116608 A1 | | 6/2003 | Litwinski |
| 2004/0173662 A1 | * | 9/2004 | Christner ................... 228/112.1 |
| 2005/0035173 A1 | * | 2/2005 | Steel et al. .................... 228/2.1 |

FOREIGN PATENT DOCUMENTS

| | | |
|---|---|---|
| JP | 02207985 | 8/1990 |
| JP | 04253578 | 9/1992 |
| JP | 2003170280 | 6/2003 |
| JP | 2005074518 | 3/2005 |
| JP | 2005305542 | 11/2005 |
| WO | 97/01057 | 1/1997 |

* cited by examiner

COMPOSITIONS AND METHODS FOR DISSIMILAR MATERIAL WELDING

This application claims priority to our copending U.S. provisional patent application with the Ser. No. 60/824,023, which was filed Aug. 30, 2006.

FIELD OF THE INVENTION

The field of the invention is welding, especially as it relates to welding of dissimilar materials.

BACKGROUND OF THE INVENTION

Welding of similar or identical materials is a relatively simple process and is routinely performed on a variety of materials. However, the stability and integrity of the welded joints between dissimilar materials is frequently problematic, and depending on the particular materials and configurations, welding of dissimilar materials has also proven to be difficult under field conditions.

For example, dissimilar material arc fusion welding can be employed when joining a relatively wide selection of dissimilar materials. However, as complete control of classical arc fusion welds is typically not achieved, strict limitations must be applied to such welds, especially where welded materials are used in an environment that poses high mechanical and/or chemical stress on the weld. Thus, dissimilar material arc fusion welds are often considered to have an increased risk of failure. In other known approaches, friction welding can be employed to fuse dissimilar materials in a process that is conceptually simple and does not require filler metal and flux. Additionally, friction welding advantageously increases stability and integrity in a variety of material combinations as compared to arc fusion welding of dissimilar materials. However, in most cases friction welding requires specialized equipment and is often limited by the particular configuration of the materials to be welded. Therefore, friction welding is generally not recommended for most welding needs in the field.

To overcome problems associated with the above welding processes, mechanical joints for dissimilar materials can be implemented. Examples for such joints are described in U.S. Pat. Nos. 255,163, 831,588, 2,159,811, 3,858,911, and 4,712,812. While such joints frequently allow coupling of dissimilar materials under field conditions, numerous difficulties nevertheless remain. Among other things, problems are often encountered with the design, modeling, bolt torquing, and bolt tensioning of these joints, typically leading to leakage or even failure of such joints. Still further, installation of such mechanical joints is often time consuming, especially where the dissimilar materials are pipes with relatively large diameter.

Therefore, while numerous compositions and methods of joining dissimilar materials are known in the art, all or almost all of them suffer from one or more disadvantages. Thus, there is still a need to provide improved composition and methods to reliably weld dissimilar materials to form a stable material connection, especially under field conditions.

SUMMARY OF THE INVENTION

The present invention is directed to adaptors and methods of using adaptors to enable welding of dissimilar materials, wherein the adaptor comprises first and second portions that are manufactured or comprise first and second dissimilar materials, which are similar to the dissimilar materials to be welded. Most preferably, the adaptors are made under controlled conditions in a shop environment (e.g., using friction stir welding) while the welding of the dissimilar materials via the adapter (e.g., pipes to equipment) is performed in the field.

In one aspect of the inventive subject matter, a method of coupling weldable and dissimilar materials includes a step of forming an adapter from a first and a second material using a fusion process in which respective ends of the first and second materials are joined, and wherein the first and second materials are dissimilar materials. In another step, integrity of the adapter is ascertained, and in still another step, the adapter is welded in an intermediate position between dissimilar materials such that the first material of the adapter is welded to a first of the dissimilar materials wherein the first material and the first of the dissimilar materials are similar, and such that the second material of the adapter is welded to a second of the dissimilar materials wherein the second material and the second of the dissimilar materials are similar.

Most preferably, the first and second materials are or comprise carbon steel, stainless steel, super austenitic stainless steel, high strength low alloy steel, a nickel alloy, a copper alloy, an aluminum alloy, titanium, lead, zinc, and magnesium, or a thermosetting polymer and a thermoplastic polymer. It should be particularly appreciated that by using such adaptors, welding can be performed in a field operation while the step of forming the adapter can be performed at a remote site relative to the field operation, thus significantly simplifying the field operation. Depending on the dissimilar materials in the field, welding can then be carried out in conventional manner using arc welding, gas welding, resistance welding, ultrasound welding, high-frequency welding, or energy beam welding, in a manual process or in an at least partially automated manner. It is further generally preferred that the adaptor has a ring shape and the fusion process is a solid state joining process (e.g., friction stir welding or rotational friction welding). Moreover, it is generally preferred that integrity of the weld in the adapter is ascertained using a non-destructive process (e.g., X-ray or ultrasound).

Thus, in another aspect of the inventive subject matter, the inventors contemplate an adapter (e.g., ring-shaped) for permanently joining dissimilar materials in a welding process, wherein the adapter comprises a first portion that is friction stir welded to a second portion, and wherein the first and second portions are manufactured from dissimilar materials that are similar to the dissimilar materials, respectively. With respect to suitable materials for the adapter, the same considerations as provided above apply. Such adapters may be provided alone or as part of a kit in which an instruction is provided (e.g., associated with the adapter or via website, advertising, or catalog) to weld the adapter in a position intermediate to a first pipe and a second pipe, wherein the first and second pipes are made from the dissimilar materials. Especially useful embodiments of configurations and devices that include the adapter presented herein are pipe spools, pipelines, T-joints, pressure vessels, and manifolds in which at least two dissimilar components are coupled together.

Various objects, features, aspects and advantages of the present invention will become more apparent from the following detailed description of preferred embodiments of the invention, along with the accompanying drawing.

DETAILED DESCRIPTION

Figure 1:
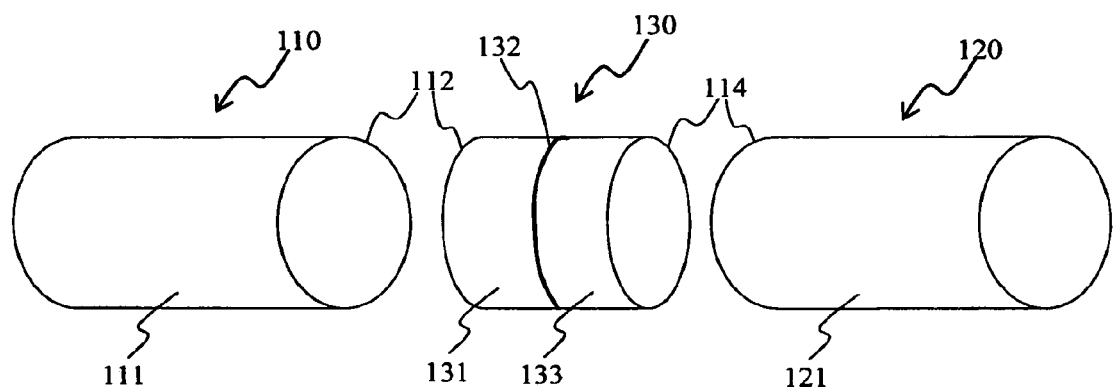
FIG. 1 is a schematic representation of an exemplary use of a dissimilar material adapter according to the inventive subject matter.

The inventors have discovered that numerous dissimilar materials can be reliably joined in a simple and field-acceptable manner by using a preformed and code acceptable dissimilar material adapter (DMA). It is generally preferred that DMAs be manufactured by friction stir welding (FSW). However, other weld processes and especially solid state weld processes, are also contemplated suitable herein. The DMAs can then be welded or otherwise fused to their respective counterparts using all known manners of joining similar materials. Particularly preferred DMAs are ring-shaped and will therefore eliminate the need for shop and field deposited dissimilar material fusion welds in pipe-to-pipe and pipe-to-equipment joints.

As used herein, the term "dissimilar materials" refers to materials that have different melt properties and thermal conductivities to such an extent that ordinary arc welding processes will typically not produce consistent welds with structural and functional integrity. Viewed from a different perspective, dissimilar materials under the scope of the definition provided herein can also be characterized as materials having different base metals with different alloy composition and in certain cases also different microstructure. For example, carbon steel and stainless steel, or high strength low alloy steel and an aluminum alloy are considered dissimilar materials under the definition provided above. While such dissimilar materials can be welded in some instances using conventional welding processes, it is very difficult to obtain consistent and satisfactory welds, and welding of such dissimilar materials is typically not conducive to field conditions. Thus, the term "similar materials" as used herein refers to materials that have similar melt properties and thermal conductivities to such an extent that ordinary arc welding processes will typically produce consistent welds with structural and functional integrity. For example, carbon steel AISI 4110 and AISI 4160 are considered similar materials under the definition provided above.

With respect to suitable fabrication processes for DMAs it is typically preferred that FSW is employed to create the DMA because of numerous benefits associated with the FSW process. For example, FSW eliminates the need for filler metal and high weld deposition temperatures, providing low distortion and shrinkage. Moreover, as FSW requires no melting of the materials, the so formed joint is not susceptible to solidification related defects that are common to fusion welding. Still further, FSW typically requires only minimum edge preparation and does not require shielding gas when joining materials that commonly require shielding when fusion welding. FSW advantages also carry over into the material properties of the joined materials. For example, FSW welds are in most cases more stable at room temperature, have improved cryogenic properties, exhibit enhanced fatigue life and immunity to weld cracking, and often provide increased yield and tensile strength when compared to classical fusion welding techniques. Additional FSW advantages include a lower degree in variability of mechanical properties, low susceptibility to stress corrosion cracking mechanisms due to low heat input and dissolution of hardening precipitants and high immunity to the existing failure mechanisms such as cracking and fatigue. Exemplary FSW processes and devices are well known in the art, and a typical process and devices are described in WO93/010935, which is incorporated by reference herein. Other suitable, less preferred 'solid state welding' methods to prepare the DMAs contemplated herein include cold welding, diffusion welding, explosion welding, forge welding, hot pressure welding, roll welding, and ultrasonic welding. It should be appreciated that a person of ordinary skill in the art will be readily able to select the most suitable welding technique depending on the nature of the dissimilar materials and/or their configuration.

Thus, it should be recognized that these advantages are imported into contemplated DMAs where the adapter portions are fabricated using FSW or other suitable processes. Joints in such DMAs will typically have higher quality, more homogenous welds with an extremely low probability of repairs due to the enhanced quality of the FSW process. Additionally, it should be recognized that contemplated DMAs allow a dissimilar material weld to be moved from the piping and equipment fabrication shop and field into the controlled FSW shop and take advantage of the FSW technique, strictly controlled FSW shop environments, and enhanced quality assurance techniques. Thus, it should be particularly appreciated that contemplated DMAs will replace the classical dissimilar material arc fusion "butt-weld", thereby allowing the shop fabricators to concentrate on similar material welds. Indeed, contemplated DMAs may entirely eliminate the need for dissimilar material arc fusion welds in both shop and field applications.

In one preferred example, the DMA is configured as a weld ring and has at least two dissimilar materials (e.g., metallic and/or non-metallic materials) and a substantially uniform diameter as exemplarily depicted in FIG. 1. Here, the ring-shaped DMA 130 is shown in side view and located between the ends of a first material pipe 110 (e.g., carbon steel 111) and a second pipe 120 (e.g., stainless steel 121). The DMA 130 is formed from two rings of identical diameter, wherein the first ring 131 is made from carbon steel and wherein the second ring 133 is made from stainless steel. The two rings 131 and 133 are welded together in a weld shop using FSW to create dissimilar material weld 132. As both ends of the DMA have the same diameter as the carbon steel pipe end and the stainless steel pipe end (112 and 114, respectively, preferably configured as ordinary butt weld end), ordinary arc welding suitable for carbon steel and stainless steel can be employed in the field or shop to join the carbon steel pipe to the stainless steel pipe.

In a typical example for such a DMA, a three inch long piece of NPS 10" s/40 carbon steel will be friction stir welded to a three inch long piece of 10" s/40 stainless steel. The so formed DMA will be mechanically and metallurgically evaluated, destructively, and/or non-destructively (e.g., via ultrasound or X-ray) tested in accordance with applicable industry standard codes. DMAs that passed quality control and assurance will thus provide an assembly far superior to conventional methods that can be used in field conditions (e.g., more than 1, more typically more than 10, and most typically more than 100 miles located from the DMA fabrication shop) without need for specialized equipment or FSW trained personnel. Similar ends are then welded or otherwise joined in the field in conventional manual or automated manner.

Of course, it should be recognized that DMAs contemplated herein need not be limited to those made from carbon steel and stainless steel materials, and that all known dissimilar materials and combinations thereof are deemed appropriate for use herein that can be fused to provide a code-acceptable fusion. Therefore, suitable materials include metals and non-metallic materials. For example, appropriate metals include carbon steel, stainless steel (both 300 and 400 series), super austenitic stainless steel (AL6XN), high strength low alloy steel (HSLA; 1-¼, 2-¼, 5 & 9 Cr—Mo, X80), various nickel, copper, and aluminum alloys, titanium, lead, zinc, and magnesium. Similarly, non-metallic materials include various thermosetting and thermoplastic polymers (HDPE, Polyethylene, Polyamides, Polypropylene, PVC, and others). Consequently, it should be appreciated that a multitude of materials can be joined, both metallic to metallic and non-metallic to non-metallic, and in some cases even metallic to non-metallic to produce code-acceptable welds for use in the field.

Similarly, it should be noted that while pipe-shaped or other configurations with circular or round cross section are generally preferred for the DMAs contemplated herein, numerous alternative configurations are also deemed suitable for use in conjunction with the teachings presented herein. For example, and among other configurations, pipes with rectangular cross section, spheroid or frustoconical cross sections, and even irregular cross sections are suitable as well as non-pipe elements, including manifolds, boxes, etc. Likewise, it should be appreciated that the particular size is not limiting to the inventive subject matter, and all spatial dimensions are appropriate so long as the DMA has a code acceptable fusion of two or more dissimilar materials.

With respect to the ends of the DMAs according to the inventive subject matter, it is contemplated that the ends may have any geometry/configuration suitable for similar material welding (which may or may not be automated). Therefore, contemplated ends may have flat ends, or may be a standard similar buttweld end, for example, machined with a standard 37.5° "V" bevel, "J" bevel, or any other type of industry accepted weld joint preparation. Similarly, the nature of the ends of the dissimilar materials that are to be fused to form the DMA may vary considerably and the particular end preparation will at least in part depend on the particular fusion method. However, it is generally preferred that the ends are either flat abutting surfaces or present a beveled edge, and most preferably suitable for friction stir welding or rotational friction welding.

Once manufactured and tested, the DMA can then be inserted between the dissimilar materials (e.g., into the piping system) and welded using any suitable welding process to join each side of the ring to its corresponding material using appropriate filler metals, fluxes, shielding gases, etc.

Thus, specific compositions and methods for dissimilar material welding have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a s definition or use of a term in a reference, which is incorporated by reference herein is inconsistent or contrary to the definition of that term provided herein, the definition of that term provided herein applies and the definition of that term in the reference does not apply.

What is claimed is:

1. A method of coupling weldable dissimilar materials, comprising:
   forming an adapter from a first and a second material using friction stir welding in which respective first ends of the first and second materials are permanently joined, wherein the first and second materials are dissimilar materials;
   wherein the dissimilar materials are selected from the group consisting of carbon steel, stainless steel, super austenitic stainless steel, high strength low alloy steel, a nickel alloy, a copper alloy, an aluminum alloy, titanium, lead, zinc, and magnesium, and have different base metals with different alloy composition, and optionally different microstructure;
   ascertaining integrity of the adapter prior to welding the adapter in an intermediate position between the dissimilar materials, and wherein the integrity of fusion between the first and second materials is ascertained in a non-destructive process; and
   welding the adapter in the intermediate position between the dissimilar materials such that a second end of the first material of the adapter is welded to a first of the dissimilar materials wherein the first material and the first of the dissimilar materials are similar, and such that a second end of the second material of the adapter is welded to a second of the dissimilar materials wherein the second material and the second of the dissimilar materials are similar.

2. The method of claim 1 wherein the first material and the first end of the dissimilar materials are identical, and wherein the second material and the second end of the dissimilar materials are identical.

3. The method of claim 1 wherein the step of welding is performed in a field operation and wherein the step of forming the adapter is performed at a remote site relative to the field operation.

4. The method of claim 1 wherein the step of welding the adapter is a process selected from the group consisting of arc welding, gas welding, resistance welding, ultrasound welding, high-frequency welding, and energy beam welding.

5. A method of coupling weldable dissimilar materials, comprising:
   forming an adapter from a first and a second material using friction stir welding in which respective first ends of the first and second materials are permanently joined, wherein the first and second materials are dissimilar materials;
   wherein at least one of the first and second materials are selected from the group consisting of a thermosetting polymer and a thermoplastic polymer;
   ascertaining integrity of the adapter prior to welding the adapter in an intermediate position between the dissimilar materials, and wherein the integrity of fusion between the first and second materials is ascertained in a non-destructive process; and
   welding the adapter in the intermediate position between the dissimilar materials such that a second end of the first material of the adapter is welded to a first of the dissimilar materials wherein the first material and the first of the dissimilar materials are similar, and such that a second end of the second material of the adapter is welded to a second of the dissimilar materials wherein the second material and the second of the dissimilar materials are similar.

* * * * *